(12) United States Patent
Iwamoto et al.

(10) Patent No.: US 6,398,950 B1
(45) Date of Patent: Jun. 4, 2002

(54) HYDROGENATION CATALYST AND METHOD OF HYDROGENATING HEAVY OIL

(75) Inventors: Ryuichiro Iwamoto; Takao Nozaki; Kei Uchikawa, all of Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 09/485,622

(22) PCT Filed: Jun. 4, 1999

(86) PCT No.: PCT/JP99/03000
§ 371 (c)(1),
(2), (4) Date: Mar. 1, 2000

(87) PCT Pub. No.: WO99/65604
PCT Pub. Date: Dec. 23, 1999

(30) Foreign Application Priority Data

Jun. 15, 1998 (JP) ............................................ 10-167078

(51) Int. Cl.$^7$ .............................................. C10G 45/08
(52) U.S. Cl. ............. 208/216 R; 208/217; 208/216 PP; 208/253; 208/251 H; 208/143; 208/144; 208/145; 502/313; 502/314; 502/315; 502/312; 502/332; 502/335; 502/337; 502/354
(58) Field of Search ................................ 502/314, 315, 502/313, 312, 332, 335, 337, 354; 208/217, 216 R, 216 PP, 253, 251 H, 143, 144, 145

(56) References Cited

U.S. PATENT DOCUMENTS

| | | | | |
|---|---|---|---|---|
| 4,081,353 A | * | 3/1978 | Kehl et al. .................. 208/216 |
| 4,179,410 A | * | 12/1979 | Simpson ...................... 502/314 |
| 4,267,071 A | * | 5/1981 | Jaffe .......................... 502/220 |
| 4,321,128 A | * | 3/1982 | Yoo ............................ 208/214 |
| 4,588,706 A | * | 5/1986 | Kukes et al. ................ 502/211 |
| 4,879,265 A | * | 11/1989 | Simpson et al. ............. 502/211 |
| 4,888,316 A | * | 12/1989 | Gardner et al. ............... 502/20 |
| 4,997,801 A | * | 3/1991 | Mitarai et al. .............. 502/168 |
| 5,139,984 A | | 8/1992 | Iwamoto et al. .............. 502/66 |
| 5,141,737 A | | 8/1992 | Iwamoto et al. ............ 423/328 |
| 5,198,100 A | * | 3/1993 | Aldrige et al. ................ 208/89 |
| 5,207,893 A | | 5/1993 | Iwamoto et al. ............ 208/111 |
| 5,280,004 A | | 1/1994 | Iino et al. ................... 502/314 |
| 5,336,394 A | | 8/1994 | Iino et al. ................ 208/216 R |
| 5,338,437 A | | 8/1994 | Iwamoto et al. ............ 208/111 |
| 5,374,350 A | * | 12/1994 | Heck et al. ................. 208/143 |
| 5,565,091 A | * | 10/1996 | Iino et al. ................ 208/216 R |
| 5,906,731 A | * | 5/1999 | Abdo et al. ............. 208/216 R |

* cited by examiner

*Primary Examiner*—Nadine Preisch
(74) *Attorney, Agent, or Firm*—Oblon, Spivak, McClelland, Maier & Neustadt, P.C.

(57) ABSTRACT

The present invention relates to a catalyst for hydrogenation treatment in which Mo—Ni, Mo—Co or the like is supported on an alumina-type carrier, and a method for hydrogenation treatment of heavy oil using the same. More specifically, it relates to the catalyst showing a specific X-ray diffraction pattern, and a method for hydrogenation treatment of heavy oil using the same.

24 Claims, No Drawings

HYDROGENATION CATALYST AND METHOD OF HYDROGENATING HEAVY OIL

TECHNICAL FIELD

The present invention relates to a catalyst for hydrogenation treatment in which Mo—Ni, Mo—Co or the like is supported on an alumina-type carrier, and a method for hydrogenation treatment of heavy oil using the same. More specifically, it relates to the above-described catalyst showing a specific X-ray diffraction pattern, and a method for hydrogenation treatment of heavy oil using the same.

BACKGROUND OF THE INVENTION

In the petroleum refining, there are a large number of steps of refining various fractions through hydrogenation treatment, and a wide variety of catalysts therefor have been developed. Typical examples are a catalyst for desulfurization and denitrification of naphtha, kerosene, light oil and the like, a catalyst for desulfurization and denitrification of heavy-duty light oil, a cracking catalyst, a catalyst for desulfurization and denitrification of residual oil and heavy oil, and so forth. Of these, a catalyst which is used in a hydrogenation treatment step of treating naphtha, kerosene and light oil, which has a relatively low boiling point and which has almost no contents of metal impurities such as vanadium and the like is degraded to a small extent by the use.

Further, these catalysts were not degraded with vanadium or the like by the use, and they were degraded mostly by accumulation of a small amount of a carbonaceous material. When this was removed through burning or the like, they could be reused. Further, with respect to the removal of the carbonaceous material, since the amount of the carbonaceous material on the catalyst is small, a reusable catalyst is obtained without the need of strict burning control. Further, catalysts once used include catalysts which are degraded to a small extent, and such catalysts can be reused as they are. These catalysts are reused in the treatment of naphtha, kerosene, light oil and the like without special care.

Moreover, a catalyst for hydrogenation treatment of heavy-duty light oil and reduced pressure light oil has recently been reused through regeneration or the like. The regeneration and use methods have been also established. For example, it has been known that in a heavy-duty light oil hydrogenolysis process, a hydrogenolysis catalyst and a hydrodenitrification catalyst for its pretreatment can be regenerated and used through hydrogen activation or oxygen activation.

Regarding the catalysts used in hydrogenation treatment of these distillation oils, since stock oils treated contain less metal impurities, metals derived from raw materials, such as vanadium and the like are less accumulated on the catalysts. Further, a carbonaceous material is not only less accumulated, but also easy to burn. In the regeneration through burning, the catalyst surface does not have quite a high temperature, and a pore structure of a catalyst carrier, a supported condition and the like of an active metal phase are less changed. Thus, the catalysts could have been reused in the treatment of distillation oils such as heavy-duty light oil, reduced pressure light oil and the like (Studies in Surface and Catalysis, vol. 88 p. 199 (1994)).

However, in the hydrogenation treatment of heavy oil having a high boiling point or containing a fraction incapable of distillation, such as residual oil, metal impurities contained in stock oil and ingredients liable to carbonization, such as asphaltene and the like are present in large amounts, and large amounts of metals and carbonaceous materials are consequently accumulated on spent catalysts. Further, qualitatively, with respect to the spent catalysts on which the metals and the carbonaceous materials have been accumulated simultaneously, the carbonaceous materials cannot easily be removed through burning. Even though they are removed through burning, the pore structure of the catalyst carrier, the supported condition of the active metal phase and the like are greatly changed. Thus, a performance as a catalyst has not been expected (Catal. Today, vol. 17, No. 4, p. 539 (1993), Catal. Rev. Sci. Eng. 33 (3 & 4) p. 281 (1991)). For this reason, these spent catalysts to which vanadium is adhered to some extent have been discarded without being reused.

The present invention aims to provide a catalyst which can be utilized through regeneration treatment or the like of a catalyst not used because of deactivation by the use in a hydrogenation treatment process, and a method for hydrogenation treatment of heavy oil using the same.

DISCLOSURE OF THE INVENTION

The present inventors have assiduously conducted investigations, and have consequently found that a preferable catalyst for hydrogenation treatment can be provided by regenerating a catalyst deactivated by the use in a heavy oil hydrogenation treatment process and analyzing a crystal condition of a support metal and the like from the X-ray diffraction pattern thereof. On the basis of this finding, they have completed the present invention.

That is, the gist of the present invention is described below.

(1) A catalyst to be fed to a heavy oil hydrogenation treatment apparatus in which an inorganic oxide carrier containing alumina contains Mo, Ni and V or Mo, Co and V, a peak height ratio $I_1/I_0$ according to the X-ray diffraction measurement is between 0.1 and 1.0, and $I_2/I_1$ is 1.0 or less in which $I_0$, $I_1$ and $I_2$ are peak heights appearing when d values of the X-ray diffraction pattern are 1.98±0.05 Å, 3.32±0.05 Å and 3.79±0.05 Å, respectively.

(2) The catalyst as recited in (1), wherein a peak height ratio $I_3/I_1$ according to the X-ray diffraction measurement is 1.0 or less in which $I_3$ is a peak height appearing when a d value of the X-ray diffraction pattern is 3.55±0.05 Å.

(3) The catalyst as recited in (1) or (2), wherein the vanadium content is between 0.1 and 35% by weight.

(4) The catalyst as recited in any of (1) to (3), wherein the carbon content is between 0.3 and 15% by weight.

(5) The catalyst as recited in any of (1) to (4), wherein a specific surface area is between 60 and 220 m²/g.

(6) The catalyst as recited in any of (1) to (5), wherein a pore volume is between 0.3 and 1.2 cc/g.

(7) The catalyst as recited in any of (1) to (6), wherein the form of the catalyst is substantially cylindrical, the axial average length is between 1.6 and 10.0 mm, a product of 1.5 mm or less is 10% by weight or less, and a product of 1.0 mm or less is 5% by weight or less.

(8) The catalyst as recited in any of (1) to (6), wherein the average length of the catalyst is between 2.0 and 10.0 mm, the product of 1.5 mm or less is 10% by weight or less and the product of 1.0 mm or less is 5% by weight or less.

(9) The catalyst as recited in any of (1) to (8) which is obtained by using a catalyst in which Mo and Ni or Mo and Co are supported on an inorganic oxide carrier containing alumina in hydrogenation treatment of heavy oil, and then regenerating the catalyst through oxidation.

(10) The catalyst as recited in any of (1) to (9), wherein the molybdenum content is in the range of 0.1 to 25% by weight, and the nickel or cobalt content is in the range of 0.1 to 10% by weight.

(11) The catalyst as recited in (10), wherein the inorganic oxide carrier containing alumina contains 0.1 to 10% by weight of phosphorus.

(12) A method for hydrogenation treatment of heavy oil using the catalyst as recited in any of (1) to (11).

(13) The method as recited in (12), wherein the hydrogenation treatment is hydrodesulfurization treatment or hydrodemetallization treatment.

BEST MODE FOR CARRYING OUT THE INVENTION

The mode for carrying out the present invention is described below.

In the present invention, a catalyst which is once used in the hydrogenation treatment process of heavy oil and the like and degraded is subjected to regeneration treatments such as screening, cleaning, oxidation and the like for providing specific properties and composition, so that it can be reused as a catalyst for hydrogenation treatment.

In the heavy oil hydrogenation treatment process, the treatment of heavy oil is conducted for various purposes. As a main purpose, desulfurization and cracking are often conducted, and also in these cases, removal of metals or nitrogen of oil formed is frequently intended. For example, in the desulfurization process for production of heavy oil, a nitrogen content and metal contents, other than a sulfur content of product heavy oil, are important quality control items in many cases.

Further, the heavy oil desulfurization process is sometimes used in the pretreatment of a catalytic cracking process for gasoline production. As a raw material for catalytic cracking, reduction of not only a sulfur content but also a nitrogen content and metal contents and hydrogenation of aromatic hydrocarbons are required at times. Further, in these hydrogenation treatment processes, a cracking performance is also required, in some cases, to obtain large amounts of light oil fractions having a high value added. Moreover, as in the hydrogenolysis process, a nitrogen compound in stock oil which becomes a catalytic poison of a cracking catalyst is sometimes preliminarily removed by a denitrification reaction.

The hydrogenation treatment of heavy oil here refers to the above-described various hydrogenation treatments of heavy oil. It includes naturally the hydrogenation treatment reaction alone as a main purpose, as well as the hydrogenation treatment reaction which is conducted simultaneously with the other hydrogenation treatment reaction and the hydrogenation treatment for pretreatment or post treatment of the other reaction.

Next, the catalyst is described. The catalyst of the present invention is a catalyst for hydrogenation treatment of heavy oil (including a catalyst already subjected to sulfurization treatment), ordinarily used which catalyst is used at least once in the hydrogenation treatment of heavy oil or the like and discharged once from a reactor in the form of a catalyst having adhered thereto vanadium and the like derived from stock oil (hereinafter referred to as a "spent catalyst").

Further, the catalyst of the present invention is produced to have the following characteristics in the pattern of the X-ray diffraction measurement by the regeneration treatment or the like, and it is a catalyst prepared to be fed to a hydrogenation treatment apparatus.

Among the spent catalysts having been used in the hydrogenation treatment of heavy oil and the like, those having such properties that they can be used as a useful catalyst for hydrogenation treatment of heavy oil are limited. The following characteristics are required in the pattern of the X-ray diffraction measurement. That is, a catalyst is required to be such that a peak height ratio $I_1/I_0$ according to the X-ray diffraction measurement is in the range of 0.1 to 1.0, and $I_2/I_1$ is 1.0 or less in which $I_0$, $I_1$ and $I_2$ are peak heights appearing when d values of the X-ray diffraction pattern are 1.98±0.05 Å, 3.32±0.05 Å and 3.79±0.05 Å. Further, a catalyst is preferable wherein a peak height ratio $I_3/I_1$ is 1.0 or less in which $I_3$ is a peak height appearing when a d value of the X-ray diffraction pattern is 3.55±0.05 Å. $I_0$ is a height up to a peak based on a line given by linking a rise point of a peak when a d value is 1.98±0.05 Å. Further, $I_1$ and $I_2$ are a height up to a peak based on a line given by linking a rise point on a high angle side of a peak when a d value is 3.79±0.05 Å and a rise point on a low angle side when a d value is 3.32±0.05 Å.

Here, $I_0$ is a peak ascribable to alumina, and becomes an index of an existing amount of alumina in a catalyst. Further, $I_1$ is a peak ascribable to $NiMoO_4$ or $CoMoO_4$, and becomes a quantitative index of an existing amount thereof. Still further, $I_2$ is a peak that becomes an index of an existing amount of $Al_2(MoO_4)_3$, and $I_3$ is a peak that becomes an index of an existing amount of vanadium oxide ($V_6O_{13}$). Since vanadium can take various oxide states, a plurality of peaks ascribable to vanadium oxides are observed according to regeneration conditions in a pattern of x-ray diffraction measurement of a catalyst after regeneration. For this reason, a peak appearing when a d value is 4.28±0.05 Å, 4.13±0.05 Å, 4.02±0.05 Å, 3.40±0.05 Å, 3.24±0.05 Å, 3.17±0.05 Å or 2.90±0.05 Å can also be selected as a peak that becomes an index of an existing amount of vanadium oxide instead of a peak $I_3$ appearing when a d value is 3.55±0.05 Å.

Accordingly, $I_1/I_0$ indicates a relative existing amount of $NiMoO_4$ or $CoMoO_4$ to an alumina carrier. $NiMoO_4$ or $CoMoO_4$ shows a degree of regeneration through oxidation treatment. When the degree is less than 0.1, no satisfactory regeneration is conducted, and hydrogenation treatment cannot be conducted as expected. Further, when it is too large and exceeds 1.0, $NiMoO_4$ or $CoMoO_4$ supported on a carrier clogs pores of the carrier so that the surface area is extremely reduced, or an active ingredient is not effectively supported but separated to be present as a mass. Thus, a function as a catalyst for hydrogenation treatment is extremely worsened. Accordingly, $I_1/I_0$ has to be in the range of 0.1 to 1.0, and it is preferably in the range of 0.2 to 0.8.

$I_2/I_1$ indicates a relative existing amount of $Al_2(MoO_4)_3$ to $NiMoO_4$ or $CoMoO_4$. $Al_2(MoO_4)_3$ is considered to be an ingredient having no catalytic activity in the hydrogenation treatment reaction, and a smaller amount is preferable. Usually, $Al_2(MoO_4)$ is little present in the catalyst production. However, it is considered to be formed when a catalyst is used in hydrogenation treatment at a high temperature or is exposed to a high temperature for removal of a carbonaceous material and the like through burning and $NiMoO_4$ or $CoMoO_4$ as an active ingredient is then reacted with alumina as a carrier. Therefore, it is advisable that $I_2/I_1$ is 1.0 or less, preferably 0.7 or less, more preferably 0.5 or less.

$I_3/I_1$ becomes an index of an existing amount of V inhibiting a hydrogenation activity to NiMoS or CoMoS exhibiting a catalytic activity in the conditions of the hydrogenation treatment reaction. When it is used in the hydrogenation treatment of heavy oil and the like for a long time, especially in the treatment of deteriorated stock oil, this value is increased. That is, a catalyst is coated with V inhibiting the hydrogenation treatment reaction to notably decrease the function as a catalyst. Further, $I_3/I_1$ is an index of severity of the oxidation treatment of the spent catalyst. When this value is large, it is considered that denaturation of active metal ingredients occurs through excessive oxidation treatment or the like. It is advisable that $I_3/I_1$ is 1.0 or less, preferably 0.5 or less, more preferably 0.3 or less.

There is a method in which contents of vanadium and a carbonaceous material are directly measured as an index of degradation of a catalyst by the use in the hydrogenation treatment process. Vanadium is usually not contained as an active ingredient of a catalyst, but is included in minor impurities contained in stock oil to be subjected to hydrogenation treatment. It is convenient as an index of degradation by the use. It is advisable that the vanadium content of the catalyst of the present invention is 35% or less, preferably 20% or less (with respect to the metal content in the catalyst, a weight of an oxide of a metal to be measured is expressed in terms of % by weight using a weight of a product which is no longer reduced by oxidation treatment at 400° C. or more as a standard weight; the same is applied to the following metal content). When the vanadium content exceeds 35%, the activity of the regenerated catalyst is too low, and the overall hydrogenation reaction does not proceed satisfactorily. Incidentally, when the vanadium content is too low, especially lower than 0.1%, vanadium is sometimes adhered to a catalyst newly produced only by sulfurization treatment with oil containing vanadium, and this catalyst is not said to be a spent catalyst considered in the present invention. Therefore, when the vanadium content is between 0.1 and 35%, preferably between 0.1 and 20%, more preferably between 2 and 10%, the effect of the present invention is exhibited well.

It is advisable that the carbon content is in the range of 0.3 to 15%, preferably in the range of 0.3 to 10% (the carbon content in the catalyst is expressed in terms of % by weight of carbon in a catalyst intended using a weight of a product which is no longer reduced by oxidation treatment at 400° C. or more as a standard weight; the same is applied to the following). The carbon content is, in many cases, between approximately 10 and 70% at the spent stage. The carbon content can be reduced by removing carbon from the catalyst through regeneration treatment. When the carbon content is too high, it covers the surface of the catalyst to reduce the catalytic activity. However, when the carbon content is properly reduced through regeneration treatment, the activity can be recovered. When the excessive oxidation treatment is conducted and the carbon content in the catalyst is less than 0.3, the relation of the peak value by the X-ray diffraction measurement is sometimes not satisfied. The reason is considered to be that the active ingredient on the catalyst is denatured and inactivated by the excessive oxidation treatment.

In a catalyst used under severe hydrogenation treatment conditions or a catalyst subjected to oxidation treatment, especially burning treatment for regeneration treatment, the catalyst surface is superheated to change a porous structure of the catalyst or a supported state of a support metal, sometimes reducing a catalytic activity. As an index for evaluating the same, there are a specific surface and a pore volume of a catalyst other than the relation of the peak value according to the X-ray diffraction measurement. The specific surface area and the pore volume of the catalyst are gradually reduced owing to adhesion of impurities during the use in the hydrogenation treatment reaction, degradation with heat during the reaction and the like, and they are also easily reduced by regeneration treatment. In order to be usable as the catalyst of the present invention, it is preferable that approximately 70% of the specific surface area and the pore volume of a new catalyst before use remain. As properties of the catalyst of the present invention, it is advisable that the specific surface area is between 60 and 220 m$^2$/g, preferably between 100 and 200 m$^2$/g, and the pore volume is between 0.3 and 1.2 cc/g, preferably between 0.4 and 0.8 cc/g.

Next, the form and the size of the catalyst are described. A catalyst used in hydrogenation treatment of heavy oil is usually produced through extrusion molding in many cases, and it takes substantially a cylindrical form. Its section is circular in most cases. There are catalysts having a three-leaf form, a four-leaf form and the like in an attempt to increase the outer surface. Further, a spherical catalyst is often used. The spherical catalyst is used when a compression strength or an abrasion resistance is especially required.

When these catalysts are once used in the hydrogenation treatment of heavy oil and the like, the forms become different from the original forms through crushing or solidification. However, the forms are approximately the original forms in many cases, and it is advisable to mainly use these. For example, it is advisable that a catalyst which is solidified in massive form or powdered is removed through sieving (screening treatment). When a catalyst which is not subjected to such a removal procedure is packed in a reactor, a pressure loss of a catalyst layer is increased or channeling occurs at a stage of conducting hydrogenation treatment by passing stock oil and a hydrogen gas, so that ordinary hydrogenation treatment cannot be conducted at times.

As a catalyst easy to use, it is advisable that the size is controlled while the form may be somewhat changed from that in the production of a catalyst. In a catalyst of a substantially cylindrical form (a catalyst which is formed by extrusion molding or the like in the production of a catalyst and mostly takes a cylindrical form or a nearly cylindrical form), it is advisable that the axial average length is between 1.6 and 10 mm, preferably between 2 and 5 mm, a product of 1. 5 mm or less is 10% by weight or less and a product of 1.0 mm or less is 5% by weight or less. In the case of a spherical catalyst or a catalyst which is not seen spherical as a whole, it is advisable that the average length (a distance of the longest portion in a catalyst is defined as a length) is between 2 and 10 mm, preferably between 2 and 5 mm, a product of 1.5 mm or less is 10% by weight or less and a product of 1.0 mm or less is 5% by weight or less.

Then, a new catalyst, a regenerated catalyst and regeneration treatment are described. First, a new catalyst includes naturally a catalyst which is produced and is not yet used in hydrogenation treatment, and a catalyst which is once used in hydrogenation treatment but stops the use after a short period of time owing to troubles in an apparatus and is reused as such. That is, it refers to a catalyst which is temporarily used but subjected to special activation treatment or which is withdrawn from a reactor and can be used as such still having a sufficient hydrogenation activity estimated at the initial stage without conducting regeneration treatments such as screening, cleaning, oxidation and the like.

A new catalyst may be an ordinary commercially available catalyst or a catalyst specially produced. Further, a catalyst subjected to sulfurization treatment as pretreatment for use in hydrogenation treatment is also available. In the basic catalyst structure, alumina alone or alumina is contained as a carrier ingredient of an inorganic oxide carrier containing alumina, for example, an alumina, alumina-phosphorus or alumina-boron carrier (phosphorus, boron or the like means its oxide), and molybdenum, nickel or cobalt is contained as a support metal. By the way, phosphorus or boron is, for convenience, a carrier ingredient, but a case where it acts as a support ingredient is not excluded.

The spent catalyst is a catalyst after hydrogenation treatment of heavy oil and the like is conducted using the new catalyst or the like, and vanadium in heavy oil is adhered to the catalyst. This vanadium has a low hydrogenation function and rather weakens the activity of a support metal or clogs pores of the catalyst, so that the hydrogenation activity is reduced in many cases. What is considered as a spent catalyst in the present invention is a catalyst which is contaminated by adhesion of vanadium to some extent through hydrogenation treatment of heavy oil. Incidentally, the spent catalyst includes a catalyst after once regenerated and reused.

The regenerated catalyst refers to a spent catalyst which does not exhibit a sufficient hydrogenation activity as such by having been once used in the hydrogenation treatment and is therefore activated through regeneration treatment. Here, the hydrogenation treatment of heavy oil or the like is generally desulfurization treatment. However, hydrogenation treatment such as demetallization, denitrification, removal of aromatics, cracking or the like is also available. Further, treatment of heavy oil is a common practice, but a spent catalyst which is regenerated after having been used in treatment of distillation oil such as heavy-duty light oil or the like is also available. Any regenerated catalyst will do so long as it can be utilized in hydrogenation treatment of heavy oil.

The regeneration treatment includes removal of oil or the like through solvent cleaning, removal of a carbonaceous material, sulfur, nitrogen and the like through burning or screening of a catalyst of a normal form by removal of a massive or powdery catalyst, and so forth. The regeneration treatment of the spent catalyst in the present invention is preferably regeneration treatment by removal treatment through cleaning and oxidation of a carbonaceous material, preferably by oxidation treatment outside a reactor.

In a preferable method for regeneration treatment of the spent catalyst having adhered thereto a large amount of a carbonaceous material, the spent catalyst is first cleaned with a solvent. Preferable examples of the solvent include toluene, acetone, alcohol, and petroleum such as naphtha, kerosene, light oil or the like. Further, a solvent that easily dissolves organic materials adhered to the spent catalyst is available. This cleaning treatment can also be achieved by circulating light oil and cleaning the catalyst while the catalyst is in a hydrogenation treatment reactor, and then drying the catalyst while passing a nitrogen gas or the like of approximately 50 to 300° C. Alternatively, it is also possible that light oil is circulated to clean the catalyst, and the catalyst is then withdrawn as such by being wetted with light oil to prevent heat generation or spontaneous ignition, and is dried as required. Further, there is also a method in which a crushed or powdery catalyst of a massive material, a scale and the like are removed from a spent catalyst withdrawn from a reactor, and the residue is cleaned with light oil and further with naphtha, making it easy to dry the catalyst. When the amount is small, a method of cleaning with toluene is appropriate for completely removing oil.

In order that the catalyst from which oil and impurities have completely been removed through cleaning exhibits a satisfactory activity, it is further required to remove a carbonaceous material through oxidation treatment. The oxidation treatment is generally conducted through burning treatment in which the temperature of the atmosphere and the oxygen concentration are controlled. When the temperature of the atmosphere is too high or the oxygen concentration is too high, the catalyst surface comes to have a high temperature, so that the crystal form or the support condition of the support metal is changed or the pores of the carrier are reduced to decrease the catalytic activity. Further, when the temperature of the atmosphere is too low or the oxygen concentration is too low, the removal of the carbonaceous material through burning is unsatisfactory, and the recovery of satisfactory activity is not expected. The temperature of the atmosphere is preferably between 200 and 800° C., especially preferably between 300 and 600° C.

It is advisable that the oxygen concentration is controlled in the range of 1 to 21%. It is preferably control the same according to a burning method, especially a contact state between a burning gas and a catalyst. It is important that the temperature of the atmosphere, the oxygen concentration, the flow rate of the gas of the atmosphere and the like are controlled to control the surface temperature of the catalyst, to suppress the change in the crystal structure or the support condition of the crystalline particles of nickel or molybdenum being a metal of hydrogenation activity in a catalyst after regeneration and to prevent the decrease in the specific surface area or the pore volume of the catalyst.

With respect to the catalyst subjected to burning treatment, it is advisable that only the catalyst of a normal form is used as a regenerated catalyst by removing a powdery catalyst and the like. Unless this procedure is conducted, an initial activity is sometimes expected well, but clogging of a catalyst layer or channeling occurs, or a pressure loss of a fluid in a reactor is increased, so that normal operation cannot be continued at times.

The catalyst of the present invention is a catalyst used in hydrodesulfurization of heavy oil or the like, and it has to be inherently a catalyst having an ability of hydrogenation treatment. With respect to a basic catalyst structure for this, a catalyst in which an oxide of molybdenum, cobalt or nickel is supported on an alumina, alumina-phosphorus or alumina-boron carrier is preferably used. Of these, a catalyst of nickel-molybdenum supported on an alumina carrier, a catalyst of nickel-molybdenum supported on an alumina-phosphorus carrier and a catalyst of nickel-molybdenum supported on an alumina-boron carrier are especially preferable.

When the carrier contains phosphorus, it is advisable that the phosphorus content is between 0.1 and 10%, preferably between 0.2 and 8% (with respect to the phosphorus content in the catalyst, the weight of phosphorus is expressed in terms of % by weight using a weight of a product which is no longer reduced by oxidation treatment at 400° C. or more as a standard weight). Further, because of the heavy oil treatment, it is advisable to contain molybdenum as a support metal in an amount of 0.1 to 25%, preferably 0.2 to 8% and cobalt or nickel in an amount of 0.1 to 10%, preferably 0.2 to 8% (with respect to the metal content in the catalyst, the weight of an oxide of a metal to be measured is expressed in terms of % by weight using a weight of a product which is no longer reduced by oxidation treatment at 400° C. or more as a standard weight; the same is applied to the following metal content).

The new catalyst having the above-described structure is produced by a usual method, for example, a method for producing a catalyst for hydrodesulfurization of heavy oil, and hydrodesulfurization treatment of normal pressure residual oil is conducted for 1 year using this catalyst. It is an ordinary method for providing the catalyst of the present invention that the thus-obtained spent catalyst is withdrawn from a reactor and regenerated by the above-described regeneration treatment method. By the way, a catalyst in the most upstream portion of the reaction or the uppermost portion of the reactor is also available so long as it is a catalyst adapted to the requirements of the present invention. Usually, however, large amounts of scales or metals are sometimes adhered to these catalysts. Thus, it is preferable to conduct removal through screening.

The heavy oil hydrogenation treatment with the catalyst of the present invention is specifically described below. When the above-described catalyst is used, the reaction conditions are not particularly limited. However, general conditions are described. In the hydrogenation treatment process, a fixed bed reactor is generally used. A reaction system such as a moving bed, a boiling bed or the like is also available. Further, a flow of a reaction product may be an upward flow or a downward flow. As the most common hydrogenation treatment, desulfurization treatment of heavy oil is mentioned.

The hydrodesulfurization treatment with this fixed bed reactor is mainly described. Heavy oil in the present invention refers to oil containing residues such as normal pressure residual oil, reduced pressure residual oil and the like, but does not include oil made only of distillation oils such as kerosene, light oil, reduced pressure light oil and the like. Heavy oil usually contains 1% by weight or more of sulfur, 200% by weight or more of nitrogen, 5% by weight or more of residual carbon, 5 ppm or more of vanadium and 0.5% or more of asphaltene. For example, other stock oil such as the above-described normal pressure residual oil, asphalt oil, thermally cracked oil, tar sand oil or mixed oil containing the same is mentioned. As heavy stock oil, any of the above-mentioned oils will do. Normal pressure residual oil, reduced pressure residual oil, mixed oil of reduced pressure residual oil or asphalt oil and cracked light oil or the like is preferably used.

In this case, the reaction temperature is between 300 and 450° C., preferably between 350 and 420° C., more preferably between 370 and 410° C. The hydrogen partial pressure is between 7.0 and 25.0 Pa, preferably between 10.0 and 18.0 Pa, more preferably between 10.0 and 18.0 Pa. The liquid space velocity is between 0.01 and 10 $h^{-1}$, preferably between 0.1 and 5 $h^{-1}$, more preferably between 0.1 and 1 $h^{-1}$. The hydrogen/stock oil ratio is between 500 and 2,500 $Nm^3/kl$, preferably between 700 and 2,000 $Nm^3/kl$, more preferably between 700 and 2,000 $Nm^3/kl$. These conditions are appropriate.

The sulfur content, the metal contents (nickel and vanadium) and the like of oil formed can be adjusted by property selecting the necessary conditions, for example, the reaction temperature, among the above-described conditions. When the heavy oil hydrogenation treatment method of the present invention is used as described above, the hydrogenation treatment of residual oil and the like can be conducted by effectively using the spent catalyst which has been so far considered unusable.

The present invention is specifically described below by referring to Examples. However, the present invention is not limited at all to these Examples.

EXAMPLE 1

(Production of a new catalyst)

Molybdenum oxide (63 g), 18 g, as NiO, of basic nickel carbonate and 33 g of phosphoric acid (purity 85%) were dissolved in deionized water to adjust the total amount to 200 ml and form an impregnating solution. The water content of this impregnating solution was adjusted to adapt to a water absorption of the following carrier, and 400 g of a four-leaf-type alumina carrier (specific surface area 230 $m^2/g$, average pore diameter 125 Å, pore volume 0.65 ml/g) were impregnated with the impregnating solution. This was dried at 120° C. for 3 hours, and burned at 500° C. for 5 hours to form new catalyst 1.

(Production of a spent catalyst)

Hydrodesulfurization treatment of normal pressure residual oil was conducted in a downward flow-type fixed bed reactor for 8,000 hours using new catalyst 1 as described above. The desulfurization treatment was continued while the reaction temperature was adjusted such that the sulfur content of the main component (boiling fraction of 343° C. or more) in oil formed became constant. The properties of typical normal pressure residual oil used are shown in Table 1, and the reaction conditions in the hydrodesulfurization treatment in Table 2. The catalyst in the reactor was cleaned with light oil, and further dried by passing a nitrogen gas. Then, the catalyst was withdrawn from ⅓ of the lower portion of the reactor, and designated spent catalyst 1.

(Production of a regenerated catalyst)

The above-obtained spent catalyst 1 was subjected to screening to remove a mass and a powder, and 150 g thereof were treated at 300° C. for 1 hour with a rotary kiln (rotational speed 5 rpm) while feeding 100 cc/min of a 100% nitrogen gas. Then, the product was burned at 450° C. for 3 hours while feeding 100 cc/mn of a mixed gas containing 50% of a nitrogen gas and 50% of air. The resulting catalyst was cooled, and a mass and a powder were then removed through screening to form regenerated catalyst 1. The compositions of new catalyst 1, spent catalyst 1 and regenerated catalyst 1 are shown in Table 3, and the forms and the properties thereof in Table 4.

(Evaluation of a regenerated catalyst)

A small-sized high-pressure fixed bed reactor (volume 200 cc) was packed with 100 cc of regenerated catalyst 1. This was preliminarily sulfurized by passing light-duty light oil adjusted to a sulfur concentration of 2.5% with the addition of DMDS as a sulfurizing agent in a 135 $kg/cm^3$ hydrogen stream at 250° C. for 24 hours. Thereafter, a hydrodesulfurization reaction was conducted using demetallized oil obtained by subjecting normal pressure residual oil to hydrodemetallization treatment as a raw material. The properties of the hydrodemetallized oil are shown in Table 1, the desulfurization conditions in Table 5, and the properties of oil formed in Table 6. By the way, a method for measuring the properties of oil formed is shown in Table 7. (Table 7 is applied to the following method for measuring oil formed.)

EXAMPLE 2

(Production of a spent catalyst and a regenerated catalyst)

Spent catalyst 2 and regenerated catalyst 2 were obtained in the same manner as in [Example 1] except that new catalyst 1 was subjected to hydrodesulfurization treatment and then withdrawn from ⅓ of the middle portion of the reactor. The compositions of spent catalyst 2 and regenerated catalyst 2 are shown in Table 8, and the forms and the properties thereof in Table 9.

(Evaluation of a regenerated catalyst)

The hydrodesulfurization reaction was conducted in the same manner as in [Example 1] using regenerated catalyst 2. The properties of oil formed are shown in Table 6.

EXAMPLE 3

(Production of a new catalyst)

Molybdenum oxide (63 g) and 18 g, as NiO, of basic nickel carbonate were dissolved in deionized water to adjust the total amount to 200 ml and form an impregnating solution. The water content of this impregnating solution was adjusted to adapt to a water absorption of the following carrier, and 400 g of a four-leaf-type alumina carrier (specific surface area 230 m$^2$/g, average pore diameter 125 Å, pore volume 0.6 ml/g) were impregnated with the impregnating solution. This was dried at 120° C. for 3 hours, and burned at 500° C. for 5 hours to form new catalyst 3.

(Production of a spent catalyst and a regenerated catalyst)

Spent catalyst 3 and regenerated catalyst 3 were obtained in the same manner as in [Example 1] except that new catalyst 3 was used. The compositions of new catalyst 3, spent catalyst 3 and regenerated catalyst 3 are shown in Table 10, and the forms and the properties thereof in Table 11.

(Evaluation of a regenerated catalyst)

The hydrodesulfurization reaction was conducted in the same manner as in [Example 1] using regenerated catalyst 3. The properties of oil formed are shown in Table 6.

EXAMPLE 4

(Evaluation of a regenerated catalyst)

The evaluation was conducted in the same manner as in [Example 1] using regenerated catalyst 1 obtained in [Example 1] and mixed oil of deashalting and cracked light oil as stock oil. The desulfurization treatment conditions are shown in Table 5, and the properties of mixed oil and the properties of oil formed in Table 12. (A method for measuring properties of mixed oil is as shown in Table 7).

EXAMPLE 5

(Production of a new catalyst)

Molybdenum oxide (63 g) and 18 g, as CoO, of cobalt carbonate were dissolved in deionized water to adjust the total amount to 200 ml and form an impregnating solution. The water content of this impregnating solution was adjusted to adapt to a water absorption of the following carrier, and 400 g of a four-leaf-type alumina carrier (specific surface area 230 m$^2$/g, average pore diameter 125 Å, pore volume 0.6 ml/g) were impregnated with the impregnating solution. This was dried at 120° C. for 3 hours, and burned at 500° C. for 5 hours to form new catalyst 5.

(Production of a spent catalyst and a regenerated catalyst)

Spent catalyst 5 and regenerated catalyst 5 were obtained in the same manner as in [Example 1] except that new catalyst 5 was used. The compositions of new catalyst 5, spent catalyst 5 and regenerated catalyst 5 are shown in Table 13, and the forms and the properties thereof in Table 14.

(Evaluation of a regenerated catalyst)

The hydrodesulfurization reaction was conducted in the same manner as in [Example 1 using regenerated catalyst 5. The properties of oil formed are shown in Table 15.

EXAMPLE 6

(Evaluation of a regenerated catalyst)

The hydrodesulfurization reaction was conducted in the same manner as in [Example 1] except that normal pressure residual oil shown in Table 1 was used instead of using the demetallized oil subjected to the hydrodemetallization treatment as a raw material. The properties of normal pressure residual oil used are shown in Table 1, and the properties of oil formed in Table 15.

Comparative Example 1

(Production of a regenerated catalyst)

Spent catalyst 1 was subjected to screening to remove a mass and a powder. Then, 150 g thereof were treated at 300° C. for 1 hour with a rotary kiln (rotational speed 5 rpm) while feeding 100 cc/min of a 100% nitrogen gas. Then, the catalyst was burned at 500° C. for 1 hour while feeding 100 cc/min of 100% air. The resulting catalyst was cooled, and a mass and a powder were then removed through screening to form regenerated catalyst 6. The composition of regenerated catalyst 6 is shown in Table 16, and the form and the properties thereof in Table 17.

(Evaluation of a regenerated catalyst)

The hydrodesulfurization reaction was conducted in the same manner as in [Example 1] using regenerated catalyst 6. The properties of oil formed are shown in Table 18.

Comparative Example 2

(Production of a regenerated catalyst)

Regenerated catalyst 7 was obtained in the same manner as in [Comparative Example 1] except that spent catalyst 2 was used. The composition of regenerated catalyst 7 is shown in Table 16, and the form and the properties thereof in Table 17.

(Evaluation of a regenerated catalyst)

The hydrodesulfurization reaction was conducted in the same manner as in [Example 1] using regenerated catalyst 7. The properties of oil formed are shown in Table 18.

Comparative Example 3

(Production of a regenerated catalyst)

Regenerated catalyst 8 was obtained in the same manner as in [Comparative Example 1] except that spent catalyst 3 was used. The composition of regenerated catalyst 8 is shown in Table 16, and the form and the properties thereof in Table 17.

(Evaluation of a regenerated catalyst)

The hydrodesulfurization reaction was conducted in the same manner as in [Example 1] using regenerated catalyst 8. The properties of oil formed are shown in Table 18.

Comparative Example 4

(Production of a regenerated catalyst)

Regenerated catalyst 9 was obtained in the same manner as in (Comparative Example 3] except that oxidation treatment was conducted with 100% air at 600° C. for 1 hour. The composition of regenerated catalyst 9 is shown in Table 19, and the form and the properties thereof in Table 20.

(Evaluation of a regenerated catalyst)

The hydrodesulfurization reaction was conducted in the same manner as in [Example 1] using regenerated catalyst 9.

The properties of oil formed are shown in Table 21.

Comparative Example 4

The hydrodesulfurization reaction was conducted in the same manner as in [Comparative Example 1] using a spent catalyst (regenerated catalyst 9) obtained as in Example 5. The composition of regenerated catalyst 10 is shown in Table 19, the form and the properties thereof in Table 20, and the properties of oil formed in Table 21.

TABLE 1

Properties of normal pressure residual oil and demetallized oil

| Items | Normal pressure residual oil | Demetallized oil | Measuring method |
|---|---|---|---|
| Density (15° C., g/cm³) | 0.981 | 0.951 | JIS K-2249 |
| Kinetic viscosity (50° C., cSt) | 880 | 200 | JIS K-2283 |
| Residual carbon (wt. %) | 12.1 | 9.0 | JIS K-2270 |
| Asphaltene (wt. %) | 6.1 | 3.5 | IP 143 |
| Contents of impurities (weight) | | | |
| Sulfur (%) | 4.03 | 2.10 | JIS K-2541 |
| Nitrogen (ppm) | 2310 | 2090 | JIS K-2609 |
| Vanadium (ppm) | 70.7 | 26.9 | JPI-5S-10-79 |
| Nickel (ppm) | 22.8 | 12.6 | JPI-5S-11-79 |
| Distillation conditions (° C.) | | | |
| IBP | 256 | 131 | JIS K-2254 |
| 10% | 390 | 340 | |
| 20% | 438 | 398 | |
| 40% | 513 | 474 | |

TABLE 2

Desulfurization reaction conditions for production of spent catalyst

| Stock oil | Example 1 Normal pressure residual oil |
|---|---|
| Hydrogen partial pressure (kg/cm²) | 130 |
| Liquid space velocity (/hr) | 0.3 |
| Hydrogen/stock oil ratio (Nm³/kl) | 850 |
| Sulfur content (wt. %) of main components in oil formed | 0.3 |
| Duration time of reaction (hr) | 8000 |

TABLE 3

Composition of catalyst 1

| Type of catalyst | New catalyst 1 | Spent catalyst 1 | Regenerated catalyst 1 Example 1 |
|---|---|---|---|
| Carrier | Alumina. phosphorus | Alumina. phosphorus | Alumina. phosphorus |
| Phosphorus content (wt. %) | 1.6 | 1.6 | 1.6 |
| Metal contents (wt. %) | | | |
| Molybdenum | 8.8 | 8.0 | 8.0 |
| Nickel | 2.3 | 3.8 | 3.8 |
| Cobalt | | | |
| Vanadium | | 5.6 | 5.6 |
| Iron (Fe₂O₃) | | 0.7 | 0.7 |
| Carbon content (wt. %) | | 22.6 | 0.7 |

TABLE 3-continued

Composition of catalyst 1

| Type of catalyst | New catalyst 1 | Spent catalyst 1 | Regenerated catalyst 1 Example 1 |
|---|---|---|---|
| Sulfur content (wt. %) | | 7.8 | 0.9 |

TABLE 4

Form and properties of catalyst 1

| Type of catalyst | New catalyst 1 | Spent catalyst 1 | Regenerated catalyst 1 Example 1 |
|---|---|---|---|
| Form | 4-leaf cylindrical | 4-leaf cylindrical | 4-leaf cylindrical |
| Average length (mm) | 3 | 2.8 | 2.8 |
| 1.5 mm or less (wt. %) | 2 | 8 | 3 |
| 1.0 mm or less (wt. %) | <1 | 3 | <1 |
| Pore structure | | | |
| Specific surface area (m²/g) | 204 | 105 | 181 |
| Pore volume (cc/g) | 0.6 | 0.25 | 0.52 |
| X-ray diffraction measurement pattern | | | |
| $I_1/I_0$ | | | 0.28 |
| $I_2/I_1$ | | | 0.33 |
| $I_3/I_1$ | | | 0.26 |

TABLE 5

Desulfurization treatment conditions

| | Example 1 | Example 4 |
|---|---|---|
| Stock oil | Normal pressure residual oil | Mixed oil |
| Sulfur content (wt. %) | 2.0 | 3.8 |
| Reaction temperature (° C.) | 375 | 335 |
| Hydrogen partial pressure (kg/cm²) | 135 | 125 |
| Liquid space velocity (/hr) | 0.3 | 0.25 |
| Hydrogen/stock oil ratio (Nm³/kl) | 840 | 850 |
| Duration time of reaction (hr) | 250 | 250 |

TABLE 6

Properties of oil formed

| Items | Example 1 | Example 2 | Example 3 |
|---|---|---|---|
| Density (15° C., g/cm³) | 0.917 | 0.920 | 0.919 |
| Kinetic viscosity (50° C., cSt) | 86 | 102 | 105 |
| Residual carbon (wt. %) | 4.3 | 4.8 | 5.1 |
| Asphaltene (wt. %) | 1.2 | 1.3 | 1.4 |
| Contents of impurities (weight) | | | |
| Sulfur (%) | 0.33 | 0.36 | 0.29 |
| Nitrogen (ppm) | 960 | 994 | 1160 |
| Vanadium (ppm) | 10.6 | 11.6 | 10.6 |
| Nickel (ppm) | 6.7 | 7.5 | 6.7 |

TABLE 6-continued

Properties of oil formed

| Items | Example 1 | Example 2 | Example 3 |
|---|---|---|---|
| Distillation conditions (° C.) | | | |
| IBP | 119 | 115 | 115 |
| 10% | 317 | 322 | 321 |
| 20% | 382 | 384 | 385 |
| 40% | 459 | 462 | 466 |

TABLE 7

Method for measuring properties of oil formed

| Items | Measuring method |
|---|---|
| Density (15° C., g/cm³) | JIS K-2249 |
| Kinetic viscosity (50° C., cSt) | JIS K-2283 |
| Residual carbon (wt. %) | JIS K-2270 |
| Asphaltene (wt. %) | IP 143 |
| Contents of impurities (weight) | |
| Sulfur (%) | JIS K-2541 |
| Nitrogen (ppm) | JIS K-2609 |
| Vanadium (ppm) | JPI-5S-10-79 |
| Nickel (ppm) | JPI-5S-11-79 |
| Distillation conditions (° C.) | |
| IBP | JIS K-2254 |
| 10% | |
| 20% | |
| 40% | |

TABLE 8

Composition of catalyst 2

| Type of catalyst | New catalyst 2 | Spent catalyst 2 | Regenerated Example 2 |
|---|---|---|---|
| Carrier | Alumina. phosphorus | Alumina. phosphorus | Alumina. phosphorus |
| Phosphorus content (wt. %) | 1.6 | 1.6 | 1.6 |
| Metal contents (wt. %) | | | |
| Molybdenum | 8.8 | 8.1 | 8.0 |
| Nickel | 2.3 | 4.2 | 4.1 |
| Cobalt | | | |
| Vanadium | | 8.7 | 8.6 |
| Iron (Fe₂O₃) | | 1.0 | 1.1 |
| Carbon content (wt. %) | | 19.3 | 0.9 |
| Sulfur content (wt. %) | | 8.3 | 0.9 |

TABLE 9

Form and properties of catalyst 2

| Type of catalyst | New catalyst 2 | Spent catalyst 2 | Regenerated catalyst 2 Example 2 |
|---|---|---|---|
| Form | 4-leaf cylindrical | 4-leaf cylindrical | 4-leaf cylindrical |
| Average length (mm) | 3.2 | 2.6 | 2.8 |
| 1.5 mm or less (wt. %) | 2 | 6 | 3 |

TABLE 9-continued

Form and properties of catalyst 2

| Type of catalyst | New catalyst 2 | Spent catalyst 2 | Regenerated catalyst 2 Example 2 |
|---|---|---|---|
| 1.0 mm or less (wt. %) | <1 | 3 | <1 |
| Pore structure | | | |
| Specific surface area (m²/g) | 204 | 126 | 183 |
| Pore volume (cc/g) | 0.6 | 0.28 | 0.54 |
| X-ray diffraction measurement pattern | | | |
| $I_1/I_0$ | | | 0.31 |
| $I_2/I_1$ | | | 0.48 |
| $I_3/I_1$ | | | 0.42 |

TABLE 10

Composition of catalyst 3

| Type of catalyst | New catalyst 3 | Spent catalyst 3 | Regenerated catalyst 3 Example 3 |
|---|---|---|---|
| Carrier | Alumina | Alumina | Alumina |
| Phosphorus content (wt. %) | 0 | 0 | 0 |
| Metal contents (wt. %) | | | |
| Molybdenum | 8.7 | 8.1 | 8.1 |
| Nickel | 2.3 | 3.4 | 3.3 |
| Cobalt | | | |
| Vanadium | | 6.3 | 6.2 |
| Iron (Fe₂O₃) | | 0.5 | 0.6 |
| Carbon content (wt. %) | — | 20.1 | 0.9 |
| Sulfur content (wt. %) | | 7.8 | 0.9 |

TABLE 11

Form and properties of catalyst 3

| Type of catalyst | New catalyst 3 | Spent catalyst 3 | Regenerated catalyst 3 Example 3 |
|---|---|---|---|
| Form | 4-leaf cylindrical | 4-leaf cylindrical | 4-leaf cylindrical |
| Average length (mm) | 3.2 | 2.5 | 2.5 |
| 1.5 mm or less (wt. %) | 2 | 8 | 5 |
| 1.0 mm or less (wt. %) | <1 | 4 | <1 |
| Pore structure | | | |
| Specific surface area (m²/g) | 220 | 111 | 185 |
| Pore volume (cc/g) | 0.65 | 0.27 | 0.55 |
| X-ray diffraction measurement pattern | | | |
| $I_1/I_0$ | | | 0.35 |
| $I_2/I_1$ | | | 0.39 |
| $I_3/I_1$ | | | 0.37 |

TABLE 12

Properties of mixed oil and oil formed (Example 4)

| Items | Mixed oil | Oil formed Example 4 |
|---|---|---|
| Density (15° C. g/cm$^3$) | 0.995 | 0.837 |
| Kinetic viscosity (50° C., cSt) | 1060 | 401 |
| Residual carbon (wt. %) | 17.3 | 10.9 |
| Asphaltene (wt. %) | 7.2 | 3.0 |
| Contents of impurities (weight) | | |
| Sulfur (%) | 3.80 | 1.35 |
| Nitrogen (ppm) | 2500 | 2220 |
| Vanadium (ppm) | 30.5 | 24.2 |
| Nickel (ppm) | 17.3 | 10.8 |
| Distillation conditions (° C.) | | |
| IBP | 163 | 133 |
| 10% | 255 | 199 |
| 30% | 503 | 246 |
| 50% | | 281 |

TABLE 13

Composition of catalyst 5

| Type of catalyst | New catalyst 5 Examples 5, 6 | Spent catalyst 5 Examples 5, 6 | Regenerated catalyst 5 Examples 5, 6 |
|---|---|---|---|
| Carrier | Alumina | Alumina | Alumina |
| Phosphorus content (wt. %) | 0 | 0 | 0 |
| Metal contents (wt. %) | | | |
| Molybdenum | 8.8 | 8.0 | 8.0 |
| Nickel | | 1.4 | 1.6 |
| Cobalt | 2.4 | 2.2 | 2.3 |
| Vanadium | | 5.2 | 5.1 |
| Iron (Fe$_2$O$_3$) | | 0.5 | 0.5 |
| Carbon content (wt. %) | — | 24.9 | 1.0 |
| Sulfur content (wt. %) | | 7.7 | 0.9 |

TABLE 14

Form and properties of catalyst 5

| Type of catalyst | New catalyst 5 Examples 5, 6 | Spent catalyst 5 Examples 5, 6 | Regenerated catalyst 5 Examples 5, 6 |
|---|---|---|---|
| Form | 4-leaf cylindrical | 4-leaf cylindrical | 4-leaf cylindrical |
| Average length (mm) | 3 | 2.5 | 2.5 |
| 1.5 mm or less (wt. %) | 2 | 8 | 5 |
| 1.0 mm or less (wt. %) | <1 | 4 | <1 |
| Pore structure Specific surface area (m$^2$/g) | 216 | 132 | 178 |
| Pore volume (cc/g) | 0.66 | 0.28 | 0.57 |
| X-ray diffraction measurement pattern | | | |
| I$_1$/I$_0$ | | | 0.25 |
| I$_2$/I$_1$ | | | 0.44 |
| I$_3$/I$_1$ | | | 0.11 |

TABLE 15

Properties of oil formed

| Items | Example 5 | Example 6 |
|---|---|---|
| Density (15° C., g/cm$^3$) | 0.920 | 0.938 |
| Kinetic viscosity (50° C., cSt) | 110 | 122 |
| Residual carbon (wt. %) | 5.0 | 6.3 |
| Asphaltene (wt. %) | 1.5 | 2.2 |
| Contents of impurities (weight) | | |
| Sulfur (%) | 0.35 | 0.97 |
| Nitrogen (ppm) | 1157 | 1218 |
| Vanadium (ppm) | 12.5 | 18.6 |
| Nickel (ppm) | 8.1 | 9.8 |
| Distillation conditions (° C.) | | |
| IBP | 117 | 115 |
| 10% | 325 | 328 |
| 20% | 390 | 391 |
| 40% | 471 | 464 |

TABLE 16

Compositions of catalysts 6 to 8

| Type of catalyst | New catalyst 6 Comparative Example 1 | Spent catalyst 7 Comparative Example 2 | Regenerated catalyst 8 Comparative Example 3 |
|---|---|---|---|
| Carrier | Alumina-phosphorus | Alumina-phosphorus | Alumina |
| Phosphorus content (wt. %) | 2.8 | 1.6 | 0 |
| Metal contents (wt. %) | | | |
| Molybdenum | 8.0 | 8.0 | 8.2 |
| Nickel | 3.8 | 4.0 | 3.3 |
| Cobalt | | | |
| Vanadium | 5.7 | 8.7 | 6.3 |
| Iron (Fe$_2$O$_3$) | 0.7 | 1.0 | 0.6 |
| Carbon content (wt. %) | 0.1 | 0.1 | 0.1 |
| Sulfur content (wt. %) | 0.3 | 0.3 | 0.3 |

TABLE 17

Forms and properties of catalysts 6 to 8

| Type of catalyst | New catalyst 6 Comparative Example 1 | Spent catalyst 7 Comparative Example 2 | Regenerated catalyst 8 Comparative Example 3 |
|---|---|---|---|
| Form | 4-leaf cylindrical | 4-leaf cylindrical | 4-leaf cylindrical |
| Average length (mm) | 2.3 | 2.3 | 2.1 |
| 1.5 mm or less (wt. %) | 3 | 3 | 4 |
| 1.0 mm or less (wt. %) | <1 | <1 | <1 |
| Pore structure Specific surface area (m$^2$/g) | 134 | 147 | 122 |
| Pore volume (cc/g) | 0.47 | 0.42 | 0.40 |
| X-ray diffraction measurement pattern | | | |
| I$_1$/I$_0$ | 0.30 | 1.87 | 1.46 |
| I$_2$/I$_1$ | 1.62 | 0.20 | 1.83 |
| I$_3$/I$_1$ | 0.35 | 1.53 | 0.78 |

TABLE 18

Properties of oil formed

| Items | Comparative Example 1 | Comparative Example 2 | Comparative Example 3 |
|---|---|---|---|
| Density (15° C., g/cm³) | 0.930 | 0.931 | 0.933 |
| Kinetic viscosity (50° C., cSt) | 137 | 134 | 147 |
| Residual carbon (wt. %) | 6.5 | 6.8 | 7.3 |
| Asphaltene (wt. %) | 2.3 | 2.2 | 2.9 |
| Contents of impurities (weight) | | | |
| Sulfur (%) | 0.58 | 0.56 | 0.62 |
| Nitrogen (ppm) | 1551 | 1580 | 1610 |
| Vanadium (ppm) | 15.6 | 16.2 | 16.8 |
| Nickel (ppm) | 8.9 | 9.9 | 9.2 |
| Distillation conditions (° C.) | | | |
| IBP | 115 | 117 | 117 |
| 10% | 344 | 349 | 342 |
| 20% | 391 | 390 | 388 |
| 40% | 466 | 462 | 460 |

TABLE 19

Compositions of regenerated catalysts 9 and 10

| Type of catalyst | Regenerated catalyst 9 Comparative Example 4 | Regenerated catalyst 10 Comparative Example 5 |
|---|---|---|
| Carrier | Alumina | Alumina |
| Phosphorus content (wt. %) | 0 | 0 |
| Metal contents (wt. %) | | |
| Molybdenum | 8.2 | 8.1 |
| Nickel | 3.3 | 1.5 |
| Cobalt | | 2.3 |
| Vanadium | 6.1 | 5.2 |
| Iron (Fe₂O₃) | 0.6 | 0.6 |
| Carbon content (wt. %) | 0.1 | 0.1 |
| Sulfur content (wt. %) | 0.1 | 0.2 |

TABLE 20

Forms and properties of catalysts 9 and 10

| Type of catalyst | Regenerated catalyst 9 Comparative Example 4 | Regenerated catalyst 10 Comparative Example 5 |
|---|---|---|
| Form | 4-leaf cylindrical | 4-leaf cylindrical |
| Average length (mm) | 2.0 | 2.3 |
| 1.5 mm or less (wt. %) | 5 | 5 |
| 1.0 mm or less (wt. %) | <1 | <1 |
| Pore structure | | |
| Specific surface area (m²/g) | 44 | 137 |
| Pore volume (cc/g) | 0.25 | 0.46 |
| X-ray diffraction measurement pattern | | |
| $I_1/I_0$ | 1.83 | 1.85 |
| $I_2/I_1$ | 2.18 | 1.62 |
| $I_3/I_1$ | 1.43 | 0.57 |

TABLE 21

Properties of oil formed

| Items | Comparative Example 4 | Comparative Example 5 |
|---|---|---|
| Density (15° C., g/cm³) | 0.937 | 0.931 |
| Kinetic viscosity (50° C., cSt) | 163 | 130 |
| Residual carbon (wt. %) | 7.8 | 6.5 |
| Asphaltene (wt. %) | 3.0 | 2.1 |
| Contents of impurities (weight) | | |
| Sulfur (%) | 0.79 | 0.69 |
| Nitrogen (ppm) | 1773 | 1627 |
| Vanadium (ppm) | 17.3 | 16.0 |
| Nickel (ppm) | 10.0 | 9.6 |
| Distillation conditions (° C.) | | |
| IBP | 119 | 115 |
| 10% | 340 | 344 |
| 20% | 388 | 388 |
| 40% | 465 | 461 |

Industrial Applicability

The regenerated catalyst of the present invention can conduct a good desulfurization reaction of residual oil or the like under the same conditions as in the treatment using an ordinary new catalyst, and exhibits excellent effects as an effective method for using a spent catalyst.

What is claimed is:

1. A catalyst comprising an inorganic oxide carrier containing alumina with Mo, Ni and V or comprising an inorganic oxide carrier containing alumina with Mo, Co and V, wherein a peak height ratio $I_1/I_0$ according to the x-ray diffraction measurement is between 0.1 and 1.0, and $I_2/I_1$ is 1.0 or less in which $I_0$, $I_1$ and $I_2$ are peak heights appearing when d values of the x-ray diffraction pattern are 1.98±0.05 Å, 33.2±0.05 Å and 3.79±0.05 Å, respectively.

2. The catalyst as claimed in claim 1, wherein a peak height ratio $I_3/I_1$ according to the X-ray diffraction measurement is 1.0 or less in which $I_3$ is a peak height appearing when a d value of the X-ray diffraction pattern is 3.55±0.05 Å.

3. The catalyst as claimed in claim 1, wherein the vanadium content is between 0.1 and 35% by weight.

4. The catalyst as claimed in claim 1, wherein said catalyst has a carbon content between 0.3 and 15% by weight.

5. The catalyst as claimed in claim 1, wherein a specific surface area is between 60 and 220 m²/g.

6. The catalyst as claimed in claim 1, wherein a pore volume is between 0.3 and 1.2 cc/g.

7. The catalyst as claimed in claim 1, wherein the form of said catalyst is substantially cylindrical, the axial average length is between 1.6 and 10.0 mm, said catalyst having an axial length of 1.5 mm or less is 10% by weight or less of the total catalyst, and said catalyst having an axial length of 1.0 mm or less is 5% by weight or less of the total catalyst.

8. The catalyst as claimed in claim 1, wherein the form of said catalyst is substantially spherical, the average length of said catalyst is between 2.0 and 10.0 mm, said catalyst having an average length of 1.5 mm or less is 10% by weight or less of the total catalyst, and said catalyst having an average length of 1.0 mm or less is 5% by weight or less of the total catalyst.

9. The catalyst as claimed in claim 1, produced by using a catalyst comprising an inorganic oxide containing alumina with Mo and Ni or comprising an inorganic oxide containing alumina with Mo and Co in hydrogenation treatment of heavy oil, and then regenerating the catalyst through oxidation.

10. The catalyst as claimed in claim 1, wherein the molybdenum content is in the range of 0.1 to 25% by weight, and the nickel or cobalt content is in the range of 0.1 to 10% by weight.

11. The catalyst as claimed in claim 10, wherein the inorganic oxide carrier containing alumina contains 0.1 to 10% by weight of phosphorus.

12. A method for hydrogenation treatment of heavy oil comprising contacting said catalyst as claimed in claim 1 with heavy oil under hydrogenation conditions.

13. The method as claimed in claim 12, wherein said hydrogenation conditions produce hydrodesulfurization or hydrodemetallization.

14. The catalyst as claimed in claim 1, wherein said peak height ratio $I_1/I_0$ is between 0.2 and 0.8.

15. The catalyst as claimed in claim 1, wherein said peak height ratio $I_2/I_1$ is 0.7 or less.

16. The catalyst as claimed in claim 1, wherein said peak height ratio $I_2/I_1$ is 0.5 or less.

17. The catalyst as claimed in claim 2, wherein said peak height ratio $I_3/I_1$ is 0.5 or less.

18. The catalyst as claimed in claim 2, wherein said peak height ratio $I_3/I_1$ is 0.3 or less.

19. The catalyst as claimed in claim 3, wherein said vanadium content is between 0.1 and 20% by weight.

20. The catalyst as claimed in claim 3, wherein said vanadium content is between 2 and 10% by weight.

21. The catalyst as claimed in claim 10, wherein said molybdenum content is in the range of 0.2 to 8% by weight.

22. The catalyst as claimed in claim 10, wherein said nickel or cobalt content is in the range of 0.2 to 8% by weight.

23. The catalyst as claimed in claim 1, wherein said catalyst comprises an inorganic carrier containing alumina with Mo, Ni and V.

24. The catalyst as claimed in claim 1, wherein said catalyst comprises an inorganic carrier containing alumina with Mo, Co and V.

* * * * *